US009688549B2

(12) United States Patent
Imai et al.

(10) Patent No.: US 9,688,549 B2
(45) Date of Patent: Jun. 27, 2017

(54) LIQUID TREATMENT DEVICE AND LIQUID TREATMENT METHOD

(71) Applicant: PANASONIC CORPORATION, Osaka (JP)

(72) Inventors: Shin-Ichi Imai, Osaka (JP); Hironori Kumagai, Osaka (JP); Mari Onodera, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 496 days.

(21) Appl. No.: 14/264,748

(22) Filed: Apr. 29, 2014

(65) Prior Publication Data
US 2014/0231329 A1  Aug. 21, 2014

Related U.S. Application Data

(63) Continuation of application No. PCT/JP2013/003969, filed on Jun. 25, 2013.

(30) Foreign Application Priority Data

Jul. 24, 2012  (JP) ................. 2012-163785

(51) Int. Cl.
*C02F 1/46* (2006.01)
*C02F 1/48* (2006.01)
(Continued)

(52) U.S. Cl.
CPC ........ *C02F 1/4608* (2013.01); *C02F 1/46109* (2013.01); *C02F 1/48* (2013.01);
(Continued)

(58) Field of Classification Search
CPC .......... C02F 1/463; C02F 1/4608; C02F 1/36; C02F 2101/308; C02F 2103/28; C02F 2305/023; C02F 2209/05; B29C 35/08
See application file for complete search history.

(56) References Cited

U.S. PATENT DOCUMENTS

| 5,464,513 A | 11/1995 | Goriachev et al. |
| 5,465,513 A | 11/1995 | Goriachev et al. |

(Continued)

FOREIGN PATENT DOCUMENTS

| CN | 202255488 U | 5/2012 |
| EP | 2072471 A1 | 6/2009 |

(Continued)

OTHER PUBLICATIONS

Japanese Office Action issued in corresponding Japanese Application No. 2013-558262, dated Apr. 15, 2014.
(Continued)

*Primary Examiner* — Walter D Griffin
*Assistant Examiner* — Cameron Allen
(74) *Attorney, Agent, or Firm* — McDermott Will & Emery LLP

(57) ABSTRACT

This disclosure of a liquid treatment device includes a first metal electrode having a part disposed in a reaction tank into which a water being treated is filled, a second metal electrode disposed in the reaction tank, an insulator having an opening portion disposed to surround the first metal electrode so that a closed space is formed. A bubble is generated from the closed space to the water being treated via the opening portion. The liquid treatment device also includes a gas supply device that supplies the space with a gas for generating the bubble, and a power supply that applies a voltage between the first metal electrode and the second metal electrode.

17 Claims, 12 Drawing Sheets

(51) Int. Cl.
  C02F 1/461    (2006.01)
  D06F 35/00    (2006.01)
(52) U.S. Cl.
  CPC .......... D06F 35/002 (2013.01); D06F 35/003 (2013.01); *C02F 2001/46138* (2013.01); *C02F 2001/46157* (2013.01); *C02F 2001/46171* (2013.01); *C02F 2201/4619* (2013.01)

(56) References Cited

U.S. PATENT DOCUMENTS

| | | | |
|---|---|---|---|
| 5,630,915 | A | 5/1997 | Greene et al. |
| 5,859,403 | A * | 1/1999 | Zigliotto ................ H05H 1/28 219/121.49 |
| 2004/0169023 | A1 * | 9/2004 | Tanaka ............... B23K 26/0604 219/121.73 |
| 2005/0189278 | A1 * | 9/2005 | Iijima ................... B01J 19/088 210/192 |
| 2009/0109141 | A1 | 4/2009 | Murase et al. |
| 2010/0126940 | A1 | 5/2010 | Ryu et al. |
| 2010/0239473 | A1 | 9/2010 | Iijima et al. |
| 2013/0098753 | A1 | 4/2013 | Sanematsu |
| 2013/0291794 | A1 | 11/2013 | Sanematsu et al. |
| 2013/0299090 | A1 | 11/2013 | Saitoh et al. |
| 2013/0333841 | A1 | 12/2013 | Narita et al. |
| 2013/0334955 | A1 | 12/2013 | Saitoh et al. |
| 2014/0014516 | A1 | 1/2014 | Kumagai et al. |
| 2014/0054242 | A1 | 2/2014 | Imai |

FOREIGN PATENT DOCUMENTS

| | | | | |
|---|---|---|---|---|
| EP | 2597938 | A1 * | 2/2013 | ............ B08B 7/00 |
| JP | 09-507428 | A | 7/1997 | |
| JP | H09-299954 | A | 11/1997 | |
| JP | 2000-005766 | A | 1/2000 | |
| JP | 2000-093967 | A | 4/2000 | |
| JP | 3068363 | U | 5/2000 | |
| JP | 2003-062579 | A | 3/2003 | |
| JP | 2005-021811 | A | 1/2005 | |
| JP | 2005-058887 | A | 3/2005 | |
| JP | 2005-529455 | A | 9/2005 | |
| JP | 2005-296909 | A | 10/2005 | |
| JP | 2006-110092 | A | 4/2006 | |
| JP | 2007-207540 | A | 8/2007 | |
| JP | 3983282 | B2 | 9/2007 | |
| JP | 2008-178870 | A | 8/2008 | |
| JP | 2009-255027 | A | 11/2009 | |
| JP | 2010-523326 | A | 7/2010 | |
| JP | 2011-056451 | A | 3/2011 | |
| JP | 2012-043769 | A | 3/2012 | |
| JP | 2012-075966 | A | 4/2012 | |
| JP | 2012-075981 | A | 4/2012 | |
| JP | 2012-164556 | A | 8/2012 | |
| JP | 2012-164557 | A | 8/2012 | |
| JP | 2012-164558 | A | 8/2012 | |
| JP | 2012-164559 | A | 8/2012 | |
| JP | 2012-164560 | A | 8/2012 | |
| JP | 2012-204248 | A | 10/2012 | |
| JP | 2012-204249 | A | 10/2012 | |
| JP | 2013-022475 | A | 2/2013 | |
| JP | 2013-022476 | A | 2/2013 | |
| JP | 2013-111312 | A | 6/2013 | |
| WO | 03-096767 | A1 | 11/2003 | |
| WO | 2006-059808 | A1 | 6/2006 | |
| WO | 2012-011332 | A1 | 1/2012 | |
| WO | 2012-108235 | A1 | 8/2012 | |
| WO | 2012-108260 | A1 | 8/2012 | |
| WO | 2012-132596 | A1 | 10/2012 | |
| WO | 2012-132611 | A1 | 10/2012 | |
| WO | 2012/157034 | A1 | 11/2012 | |
| WO | 2013-011761 | A1 | 1/2013 | |
| WO | 2013-011762 | A1 | 1/2013 | |
| WO | 2013-080435 | A1 | 6/2013 | |

OTHER PUBLICATIONS

English translation of International Search Report issued in PCT/JP2013/003969, dated Sep. 10, 2013.
Japanese Office Action issued in correspondsing Japanese Application No. 2013-558262, dated Jul. 15, 2014.
Extended European Search Report issued in European Application No. 13823391.1 dated Oct. 27, 2014.
Japanese Office Action issued in Japanese Application No. 2013-558262 dated Nov. 11, 2014.
Translation of Written Opinion of the International Searching Authority issued in International Application No. PCT/JP2013/003969 dated Sep. 10, 2013.
Chinese Office Action issued in Chinese Application No. 201380003505.7 dated Dec. 23, 2015, with Partial English Translation.

* cited by examiner

LIQUID TREATMENT DEVICE AND LIQUID TREATMENT METHOD

CROSS-REFERENCE

This is a continuation application of International Application No. PCT/JP2013/003969, with an international filing date of Jun. 25, 2013, which claims priority of Japanese Patent Application No. 2012-163785 filed on Jul. 24, 2012, the content of which is incorporated herein by reference.

DESCRIPTION OF THE RELATED ART

The present disclosure relates to a liquid treatment device and a liquid treatment method which treats a liquid such as a water by generating a plasma in the liquid.

The conventional liquid treatment device by use of a high voltage pulse discharge is disclosed in Patent Literature 1 (Japanese Patent Laid-open Publication No. 2009-255027), for example. FIG. 12 is a block diagram of a conventional sterilization device disclosed in Patent Literature 1.

The sterilization device 1 shown in FIG. 12 includes a discharge electrode 6 that pairs a high voltage electrode 2 having a circular cylindrical shape with a ground electrode 3 having a plate shape. The high voltage electrode 2 is coated with an insulator 4 except for the end surface of the distal end portion 2a. The high voltage electrode 2 and the insulator 4 make a high voltage electrode portion 5. The high voltage electrode 2 and the ground electrode 3 are disposed at predetermined intervals, and are faced in a state of being immersed in a water 8 being treated in a treatment tank 7. The high voltage electrode 2 and the ground electrode 3 are connected with a power supply 9 generating a high voltage pulse. The power supply 9 applies the high voltage pulse of a negative polarity having 2 to 50 kV/cm and 100 Hz to 20 kHz between both the electrodes so as to discharge. A bubble 10 including a water vapor is generated by an evaporation of water using an energy applied by the power supply and the vaporization associated with the shock wave. The sterilization device 1 generates reactive species such as OH, H, O, $O_2^-$, $O^-$, $H_2O_2$ by the plasma generated in the vicinity of the high voltage electrode 2, and sterilizes microorganisms and bacteria.

Also, another conventional liquid treatment device is disclosed in Patent Literature 2 (Japanese Patent Laid-open Publication No. 2000-93967). The liquid treatment device of Patent Literature 2 discloses that an applied voltage can be lowered, and an amount of power consumption can be reduced by intervening to a bubble supplied from outside between electrodes in a liquid. Patent Literatures 3 (Japanese Patent Laid-open Publication No. 2003-62579), 4 (Japanese Patent Laid-open Publication No. 2010-523326), and 5 (Japanese Patent No. 3983282) also disclose similar arts.

SUMMARY

However, in the conventional device, there has had problem that the plasma generation efficiency is low, and it takes a long time to treat a liquid.

Therefore, one non-limiting and exemplary embodiment provides a liquid treatment device and a liquid treatment method that can treat a liquid in a short time by generating plasma effectively and thereby generating reactive species effectively. Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, a liquid treatment device according to the disclosure comprises:

a first metal electrode having a part disposed in a reaction tank into which a water being treated is filled;

a second metal electrode disposed in the reaction tank;

an insulator having an opening portion disposed to surround the first metal electrode so that a closed space is formed, wherein a bubble is generated from the closed space to the water being treated via the opening portion;

a gas supply device that supplies the space with a gas for generating the bubble; and a power supply that applies a voltage between the first metal electrode and the second metal electrode.

These general and specific aspects may be implemented using a liquid treatment device, a liquid treatment method, and any combination of liquid treatment devices and liquid treatment methods.

The liquid treatment device and the liquid treatment method according to the present disclosure are capable of treating a liquid in a short time by generating plasma effectively.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

Figure 1:
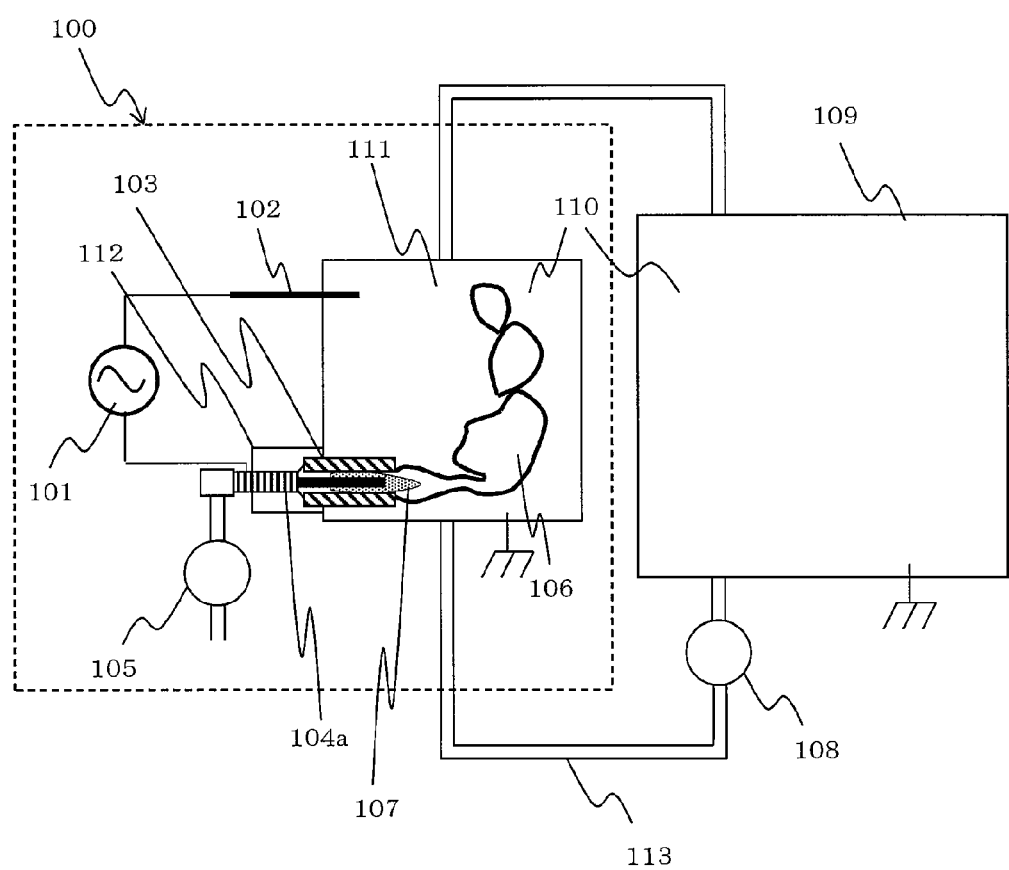
FIG. 1 shows an overall block diagram of a liquid treatment device according to a first embodiment of the present disclosure.

DETAILED EMBODIMENTS (Circumstances Leading to One Embodiment According to the Present Disclosure)

As described in the above "Description of Related Art", the conventional sterilization device of Patent Literature 1 vaporizes a liquid instantaneously utilizing a flash boiling phenomenon, and generates plasma by discharging between a high voltage electrode having a columnar shape and a ground electrode having a plate shape. However, since it is necessary to add energy to vaporize the liquid in order to cause a flash boiling phenomenon, there has had the problem that the plasma cannot be generated effectively, and it takes a long time to treat the liquid.

Also, in the conventional liquid treatment device, a first metal electrode is made of a metallic material having a high plasma resistance, but these metals are materials which are difficult to process to any shape. In the case of processing the first metal electrode, there has had the problem of a high manufacturing cost.

Therefore, the present inventors have found and disclosed a configuration of supplying a gas from a gas supply device continuously, generating a bubble in a water being treated, generating a plasma effectively, and thereby being able to generate reactive species effectively and treat a liquid treatment in a short time. Also, in the first metal electrode, the present inventors have found a configuration of the first metal electrode of low manufacturing costs and stable characteristics by making an electrode portion not exposed to the plasma and an electrode portion exposed to the plasma by use of different materials.

A liquid treatment device in the first aspect of the present disclosure includes:

a first metal electrode having a part disposed in a reaction tank into which a water being treated is filled;

a second metal electrode disposed in the reaction tank;

an insulator having an opening portion disposed to surround the first metal electrode so that a closed space is formed, wherein a bubble is generated from the closed space to the water being treated via the opening portion;

a gas supply device that supplies the space with a gas for generating the bubble; and a power supply that applies a voltage between the first metal electrode and the second metal electrode.

A liquid treatment device in the second aspect of the present disclosure includes:

a first metal electrode having a part disposed in a reaction tank into which a water being treated is filled;

a second metal electrode disposed in the reaction tank;

an insulator having an opening portion disposed to form a space between an outer circumference of the first metal electrode and the insulator, wherein a bubble is generated from the space to the water being treated via the opening portion;

a gas supply device that supplies the space with a gas for generating the bubble; and a power supply that applies a voltage between the first metal electrode and the second metal electrode.

In the liquid treatment device of the third aspect according to the second aspect of the present disclosure, the first metal electrode is a hollow shape having an opening end.

In the liquid treatment device of the fourth aspect according to the first aspect of the present disclosure, the part of the first metal electrode disposed in the reaction tank has a coil-shape.

In the liquid treatment device of the fifth aspect according to the first aspect of the present disclosure, the insulator has a plurality of the opening portions.

In the liquid treatment device of the sixth aspect according to the first aspect of the present disclosure, the first metal electrode is configured to connect with at least two portions, the at least two portions includes a one end side portion disposed in the reaction tank and the other end side portion connected to the power supply.

In the liquid treatment device of the seventh aspect according to the sixth aspect of the present disclosure, the first metal electrode includes the one end side portion and the other end side portion which are made of a different material each other.

In the liquid treatment device of the eighth aspect according to the sixth aspect of the present disclosure, the other end portion of the first metal electrode includes a threaded portion.

In the liquid treatment device of the ninth aspect according to the sixth aspect of the present disclosure, a through-hole is made at the other end portion of the first metal electrode so as to connect the gas supply device with the space.

In the liquid treatment device of the tenth aspect according to the first aspect of the present disclosure, the first metal electrode is disposed at a position which is more than zero and less than 7 mm inward from the opening portion of the insulator.

In the liquid treatment device of the eleventh aspect according to the first aspect of the present disclosure, the insulator has a first opening portion generating the bubble in the water being treated, and a second opening portion connected with the gas supply device.

In the liquid treatment device of the twelfth aspect according to the eleventh aspect of the present disclosure, the first opening portion of the insulator has a diameter ranging from 0.3 mm to 2 mm.

A liquid treatment device in the thirteenth aspect according to the first aspect of the present disclosure further includes: a reaction tank in which the first metal electrode and the second metal electrode are disposed.

In the liquid treatment device of the fourteenth aspect according to the thirteenth aspect of the present disclosure, an inside wall of the reaction tank is connected to ground.

A liquid treatment device in the fifteenth aspect according to the first aspect of the present disclosure further includes: a treatment tank which is connected to the reaction tank by use of a circulation pump and a pipe.

In the liquid treatment device of the sixteenth aspect according to the fifteenth aspect of the present disclosure, the treatment tank is selected from a group of a water clarification device, an air conditioner, a humidifier, a washing machine, an electric razor washer, and a dish washer.

In the liquid treatment device of the seventeenth aspect according to the fifteenth aspect of the present disclosure, the treatment tank is electrically connected to ground.

In the liquid treatment device of the eighteenth aspect according to the first aspect of the present disclosure, a voltage is applied by use of the power supply so as to discharge between the first metal electrode and the second metal electrode to generate plasma in the bubble, and treat the water being treated.

A liquid treatment method in the nineteenth aspect of the present disclosure includes:

applying a voltage between a first metal electrode and a second metal electrode, at least a part of the first metal electrode disposed in a reaction tank into which a water being treated is filled, and the second metal electrode disposed in the reaction tank;

supplying a closed space with a gas, where the closed space is formed by an insulator surrounding the first metal electrode; and generating a bubble in the water being treated from an opening portion of the insulator.

In the liquid treatment method of the twentieth aspect according to the nineteenth aspect of the present disclosure, applying a voltage includes discharging between the first metal electrode and the second metal electrode, generating plasma in the bubble, and treating the water being treated.

These general and specific aspects may be implemented using a liquid treatment device, a liquid treatment method, and any combination of liquid treatment devices and liquid treatment methods.

Hereinafter, embodiments of the present disclosure will be described with reference to the drawings. Note, in all figures below, the same or corresponding portions will be denoted by the same symbols, without redundant description.

First Embodiment

Figure 2:
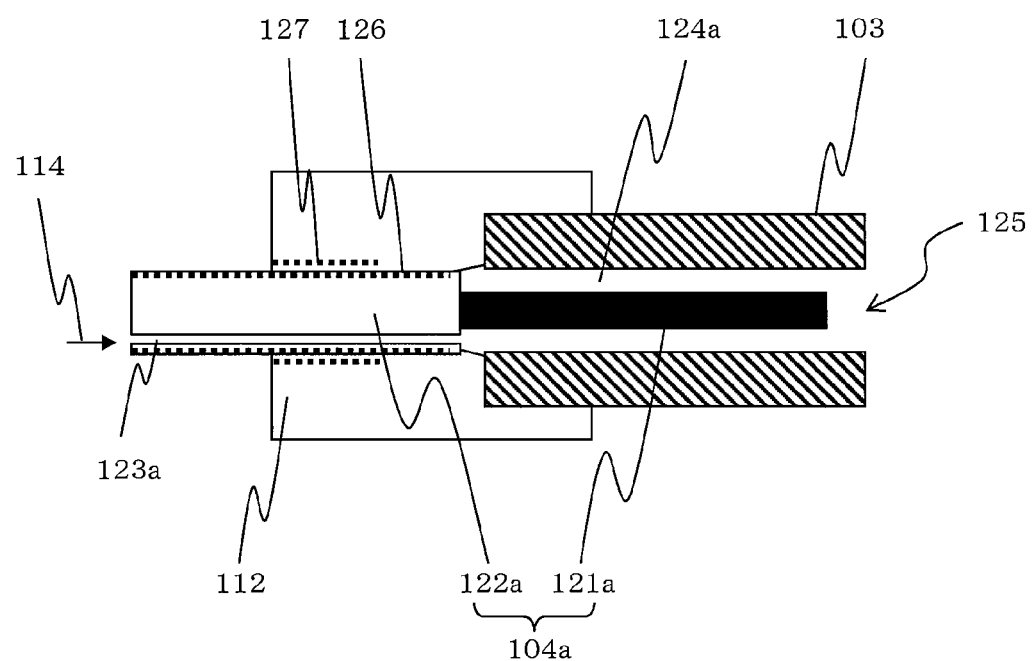
FIG. 2 shows a cross-sectional view of an electrode configuration according to the first embodiment of the present disclosure.

FIG. 1 is an overall block diagram of a liquid treatment device 100 according to a first embodiment of the present disclosure. FIG. 2 shows a cross-sectional view of the electrode configuration according to the first embodiment of the present disclosure.

The liquid treatment device 100 according to the first embodiment includes a first metal electrode 104a having a part disposed in a reaction tank 111 into which a water 110 being treated is filled, a second metal electrode 102 disposed in the reaction tank 111, an insulator 103 having an opening portion 125 disposed to form a space 124a between an outer circumference of the first metal electrode 104a and the insulator 103. A bubble 106 is generated from the space 124a to the water 110 being treated via the opening portion 125. The liquid treatment device 100 also includes a gas supply device 105 that supplies the space 124a with a gas 114 for generating the bubble 106, and a power supply 101 that applies a voltage between the first metal electrode 104a and the second metal electrode 102. In the first embodiment, the liquid treatment device 100 further may include a treatment tank 109 in addition to the above configuration which is explained, as shown in FIG. 1. In the first embodiment, the treatment tank 109 is not an essential component, the liquid treatment device 100 may include the reaction tank 111.

As shown in FIG. 1, the reaction tank 111 and the treatment tank 109 are filled with the water 110 being treated, and are connected by a pipe 113 having a circulating pump 108. At the one wall of the reaction tank 111, the first metal electrode 104a and the second metal electrode 102 which penetrate the wall, are disposed. A one end side of each electrode is positioned in the reaction tank 111. The first metal electrode 104a has a columnar shape. Other end side of the first metal electrode 104a is held by a holding block 112, is connected with the gas supply device 105. For example, the gas supply device 105 provides a space 124a which is formed between the first metal electrode 104a and the insulator 103 with a gas 114 via a through-hole 123a arranged at the other end side of the first metal electrode 104a. The second metal electrode 102 has a columnar shape. The one end side of the second metal electrode 102 is disposed so as to contact the water 110 being treated in the reaction tank 111. The power supply 101 is connected between the first metal electrode 104a and the second metal electrode 102. The power supply 101 applies a voltage between the first metal electrode 104a and the second metal electrode 102.

[Electrode Configuration]

Next, there is explained the electrode configuration of the liquid treatment device 100 according to the first embodiment of the present disclosure.

As shown in FIG. 2, the first metal electrode 104a includes a metal electrode portion 121 which is disposed in the reaction tank 111 at the one end side, and a metal threaded portion 122a which connects and secures to the holding block 112 as well as connects with the power supply 101 at the other end side. Also, the insulator 103 is disposed so as to form the space 124a between the metal electrode portion 121a and the insulator 103. The insulator 103 has the opening portion 125 which generates a bubble 106 in the water 110 being treated. In addition, the metal threaded portion 122a includes a threaded portion 126 at an outer circumference, and the through-hole 123a at the inside.

In the first metal electrode, the metal electrode portion 121a and the metal threaded portion 122a may have different size, and may be made of the metal electrode of different materials. In the first embodiment, as an example, the metal electrode portion 121a may have a diameter of 0.95 mm, and may be made of tungsten. The metal threaded portion 122a may have a diameter of 3 mm, and may be made of iron. Also, the metal electrode portion 121a may have a diameter which can generate a plasma, and the diameter may be less than or equal to 2 mm. A material of the metal electrode portion 121a is not limited to tungsten, and may be made of other materials having a plasma resistance. A material of the metal electrode portion 121a may be made of copper, aluminum, iron and their alloys. Further, a thermal spray of yttrium oxide having an electrical resistivity of 1 to 30 $\Omega$cm, at a part of the surface of the metal electrode portion 121a may be performed by adding a conductive material. The first metal electrode 104a obtains an effect that the electrode life is prolonged due to the thermal spray of yttrium oxide. On the other hand, the diameter of the metal threaded portion 122a is not limited to 3 mm. The dimensions of the diameter of the metal threaded portion 122a may be greater than the diameter of the metal electrode portion 121a. The material of the metal threaded portion 122a may be a metal material that is easy to process to any shape. For example, the metal threaded portion 122a may be made of a general thread material, such as copper, zinc, aluminum, tin and brass. For example, the first metal electrode 104a may be made by integrally pressing the metal electrode portion 121a into the metal threaded portion 122a. Therefore, the liquid treatment device 100 is capable of providing the first metal electrode 104a having a plasma resistance, low manufacturing costs, and stable characteristics by using a metal material having a high plasma resistance at the metal electrode portion 121a, and by using a metal material that is easy to process at the metal threaded portion 122a.

The through-hole 123a leading to the gas supply device 105 may be arranged at the metal threaded portion 122a. The through-hole 123a leads to the space 124a. The gas supply device 105 supplies the space 124a with the gas 114 via the through-hole 123a. The gas 114 is streamed around the metal electrode portion 121a of the first metal electrode 104a. The metal electrode portion 121a is coated with the gas 114 supplied through the through-hole 123a. In the case of one through-hole 123a, the through-hole 123a may be arranged at the metal threaded portion 122a such that the gas 114 is supplied the space 124a at the underside with respect to the direction of a gravitational force of the metal electrode portion 121a as shown in FIG. 2. As such, the metal electrode portion 121a is easy to be coated with the gas 114. In addition, in the case of two or more through-holes 123a, it is beneficial to reduce the pressure loss in the through-hole 123a. In the first embodiment, the diameter of the through-hole 123a may be 0.3 mm, for example.

The threaded portion 116 may be arranged at the outer circumference of the metal threaded portion 122a. For example, in the case that the threaded portion 116 at the outer circumference of the metal threaded portion 122a is an external thread and a threaded portion 127 which is an internal thread is arranged at the holding block 112, the first metal electrode 104a can be fixed to the holding block 112 by screwing the threaded portion 116 into the threaded portion 117. Also, the position of the end surface of the metal electrode portion 121a with respect to opening portion 125 arranged in the insulator 103, can be adjusted precisely by rotating the metal threaded portion 122a. In addition, because the connection to the power supply 101 can be fixed by screwing the threaded portion 116, it is possible to lead to stabilization of the contact resistance, thereby stabilizing the characteristics. Furthermore, the connection with the gas supply device 105 is done reliably. Design like this is very beneficial for a safety measure and a waterproof measure when putting into practical use.

Around the metal electrode portion 121a, the insulator 103 having an inner diameter of 1 mm is disposed, for example, and the space 124a is formed between the metal electrode portion 121a and the insulator 103. The gas supply device 105 supplies the space 124a with the gas 114, and coats the metal electrode portion 121a with the gas 114. Therefore, the outer circumference of the metal electrode portion 121a does not come into direct contact with the water 110 being treated despite the metal electrode portion is exposed. In addition, the insulator 103 has the opening portion 125. The opening portion 125 may determine the size of the bubble 106 when the bubble 106 is generated in the water 110 being treated in the reaction tank 111. In the first embodiment, the insulator 103 is made of alumina ceramic. The insulator 103 also may be made of magnesia, yttrium oxide, or silica.

As shown in FIG. 2, the opening portion 125 of the insulator 103 may be arranged at an end surface of the insulator 103. The opening portion 125 may be arranged at side surface of the insulator 103. Also, the insulator 103 has a plurality of the opening portions 125. As an example, the diameter of the opening portion 125 of the first embodiment is 1 mm.

A material of the second metal electrode 102 is not limited. The second metal electrode 102 may be made of a conductive material, such as cooper, aluminum, or iron.

The gas supply 105 may be, for example, a pump. The gas 114 which is supplied may be, for example, air, He, Ar, or $O_2$.

The power supply 101 may apply a pulse voltage or an AC voltage between the first metal electrode 104a and the second metal electrode 102.

The treatment tank 109 may be, for example, a water clarification apparatus, an air conditioner, a humidifier, a washing machine, an electric razor washer, or a dish washer. The treatment tank 109 may be electrically connected to ground so as to prevent from an electric shock.

The reaction tank 111 may be connected with the treatment tank 109, for example, by use of the pipe 113 having the circulation pump 108. The total volume of the reaction tank 111 and the treatment tank 109 is approximately 600 ml (approximately 600 $cm^3$). The water 110 being treated is circulated in the reaction tank 111 and the treatment tank 109 by the circulation pump 108. The circulation velocity of the water 110 being treated is set to an appropriate value from the volume of the reaction tank 111 and the decomposition velocity of the decomposition product by the plasma 107.

According to the above configuration, in the case that the gas supply device 105 supplies the space 124a which is made between the insulator 103 and the metal electrode portion 121a of the first metal electrode 104a with the gas 114 via the through-hole 123a of the first metal electrode 104a, the bubble 106 is generated in the water 110 being treated. The bubble 106 becomes a pillared bubble having size that the gas in the bubble 106 covers the opening portion 125 of the insulator 103. In the first embodiment, the opening portion 125 of the insulator 103 has a function to generate the bubble 106 in the water 110 being treated. Also, by appropriately setting the supply amount of the gas 114 by use of the gas supply device 105, the metal electrode portion 121a of the first metal electrode 104a may be covered with the gas 114.

In this specification, "the metal electrode portion (or the surface of the metal electrode portion) is not in direct contact with a liquid (the water being treated)" means that the surface of the metal electrode portion is not in contact with a liquid as a large chunk in the reaction tank. Therefore, for example, when the bubble is generated in a state that the surface of the metal electrode portion is wetted by the liquid, a state that the gas in the bubble covers the surface may be generated while the surface of the metal electrode portion is wetted by the liquid (i.e. while the surface of the metal electrode portion is in contact with the liquid when more appropriate). Such state also may be included in the state of "the metal electrode portion is not in direct contact with a liquid".

[Operation]

Next, there is explained an operation of the liquid treatment device 100 according to the first embodiment of the present disclosure.

The gas supply device 105 supplies the space 124a made between the insulator 103 and the metal electrode portion 121a of the first metal electrode 104a with the gas 114 via the through-hole 123a of the first metal electrode 104a. The flow rate of the gas 114 is, for example, 0.5 L/min to 2.0 L/min. In the water 110 being treated, as described above, the pillared bubble 106 is made so as to cover the metal electrode portion 121a of the first metal electrode 104a. The bubble 106 becomes a single large bubble which is uninterrupted over a constant distance (more than or equal to 10 mm as shown by a diagram) from the opening 125 of the insulator 103. That is, by supplying the gas, the gas 114 is flowed into the space 124a between the insulator 103 and the metal electrode portion 121a of the first metal electrode 104a. The metal electrode portion 121a of the first metal electrode 104a becomes in the state of being covered by the gas 114.

The power supply 101 applies a voltage between the first metal electrode 104a and the second metal electrode 102.

For example, the power supply 101 may apply a pulse voltage having a peak voltage of 4 kV, a pulse width of 1 μs, a frequency of 30 kHz between the first metal electrode 104a and the second metal electrode 102. The power supply 101 generates the plasma 107 in the bubble 106 from nearby the metal electrode portion 121a of the first metal electrode 104a by applying a voltage between the first metal electrode 104a and the second metal electrode 102. The plasma 107 is generated broadly over the internal space as well as the bubble 106 of the distal end portion of the first metal electrode 104a. This is a result that the water 110 being treated is functioned as an opposite electrode through the insulator 103. Also, a large amount of ions are generated by the effect, and leads to the generation of a large amount of radical in the water 110 being treated. That is, a large effect arises because the first metal electrode 104a is disposed in the water 110 being treated as the present disclosure.

The distance between the first metal electrode 104a and the second metal electrode 102 may be arbitrary. For example, the distance between the electrodes is not limited to the distance of 1 to 50 mm according to Patent Literature 1. The liquid treatment device 100 of the present disclosure can generate the plasma even if the distance between the electrodes is larger than 50 mm.

In addition, the liquid treatment device 100 according to the present disclosure may not face the first metal electrode 104a and the second metal electrode 102, while Patent Literature 1 is required to face the first metal electrode and the second metal electrode. The position of the second metal electrode 102 is not limited, as long as at least part of the second metal electrode 102 contacts the water 110 being treated. As shown in FIG. 1, the treatment tank 109 may be electrically connected to ground. Because the treatment tank 109 is electrically connected to ground, the second metal electrode 102 is equal to being connected to ground via the water 110 being treated. That is, because the second metal electrode 102 contacts the water 110 being treated, a whole of the water 110 being treated becomes the same potential, and the interface part between the liquid and the bubble 106 functions as an electrode. As a result, an opposite electrode is made near the first metal electrode 104a by supplying the bubble 106. There is equal to making the opposite electrode having a large area in the liquid of the water 110 being treated as the volume of the bubble 106 is larger. The plasma 107 also becomes larger depending on the size of the bubble 106. When using the reaction tank 111 only, the inside wall of the reaction tank 111 is electrically connected to ground. This is because when the reaction tank 111 is made of an insulator, the water cannot be electrically connected to ground even if the outside wall of the reaction tank 111 is electrically connected to ground.

Also, the pulse voltage is not limited. The plasma 107 can be generated by applying the pulse voltage such as 1 Hz to 100 kHz sufficiently. Because the accumulated time of the generated plasma 107 becomes longer as the frequency is higher, the production amount of electrons, ions and radicals which are generated by the plasma 107 is increased. That is, it means to improve the treatment capacity of the water 110 being treated using these generated particles. On the other hand, it is needless to say that the voltage is not determined only by the ability of the power supply, and is determined by the balance between the impedance of the load and the ability of the power supply. Also, there is an advantage that the life of the electrodes becomes longer by applying so-called bipolar pulse voltage which alternately applies a negative pulse voltage and a positive pulse voltage when a pulse voltage is applied. In the first embodiment, the positive voltage of 4 kV can be applied in the state of connecting the load including the electrodes as described above by use of the power supply having a capability of outputting the voltage of 10 kV in the state with no load, for example. Since the lifetime of OH radical is very short, it is difficult to observe OH radical by use of the ESR method only.

[Effect (OH Radical Generation)]

Next, there is explained the effect (OH radical generation) of the liquid treatment device 100 according to the first embodiment of the present disclosure.

Figure 3:
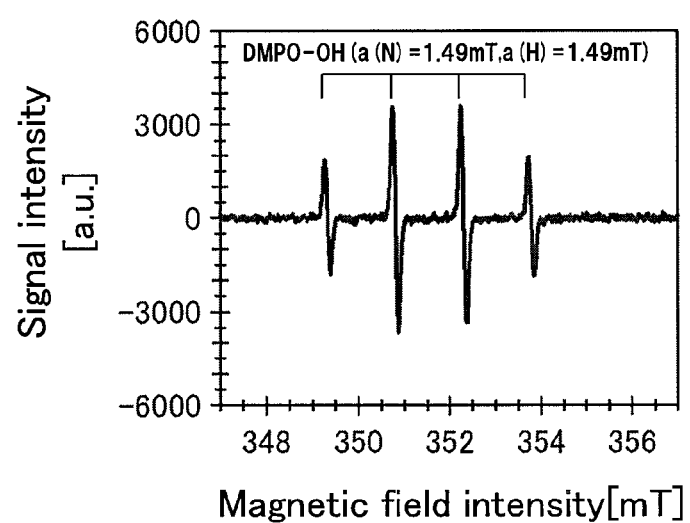
FIG. 3 shows a view of a measurement result by the ESR method of OH radical in the water being treated according to the first embodiment of the present disclosure.

FIG. 3 is an illustration of a measurement result by the ESR method of OH radical in the water being treated according to the first embodiment of the present disclosure. While not shown in figure, there has been confirmed in advance that OH ion, H ion, O ion, and $N_2$ ion are generated. In the first embodiment, the measurement has been performed by use of ESR (Electron Spin Resonance) method so as to measure what these ions would be like in the water 110 being treated. FIG. 3 shows that OH radical presents in the water 110 being treated as OH radical.

In the case of measuring OH radical by use of ESR method, a method for measuring OH radical by coupling a spin-trapping agent called DMPO with OH radical. According to this method, since a lifetime of OH radical trapped by DMPO is longer than or equal to an ESR measurement time, OH radical can be measured quantitatively.

As shown in FIG. 3, four ESR spectra of 1:2:2:1 are observed at which a hyperfine coupling constants a (N) and a (H) are 1.49 mT. The hyperfine coupling constant indicates a split width that is broke up by a hyperfine structure. The hyperfine coupling constant is one of a measurable parameter by use of ESR method. It is possible to know the presence of a radical from the hyperfine coupling constants and ESR spectra which are measured. From the observed ESR spectra as shown in FIG. 3, it is possible to know the presence of DMPO-OH adduct which is a substance generated by a spin-trapping reaction of DMPO with OH radical. This indicates that OH ion generated in the plasma 107 recombines with an electron at the interface between the bubble 106 and the water 110 being treated, becomes OH radical, and diffuses in the water 110 being treated, and that OH radical presents in the water 110 being treated. Hereinafter, there is described a lifetime of OH radical. It is generally known that a lifetime of OH radical is very short, and it is said that OH radical disappears within 1 μsec to 1 msec. However, in the FIG. 3, the result indicated that OH radical presents in the water 110 being treated is obtained. The obtained result shows that OH radical having a lifetime longer than a conventional lifetime is generated in the liquid treatment device 100 of the present disclosure. In the first embodiment, according to measuring the lifetime of OH radical, it is found that the lifetime of OH radical is longer than 10 min approximately. The lifetime of OH radical in the first embodiment is measured by changing a time from stopping the plasma 107 after generating the plasma 107 to sampling.

Also, there are two methods for adding DMPO with respect to the lifetime of OH radical.

One is a method to measure OH radical by adding a desirable amount of DMPO directly to the water 110 being treated and collecting a desirable amount of the water 110 being treated for the ESR measurement after a certain time that the water 110 being treated is treated by the plasma 107. This method has an advantage that OH radical can be measured when a certain amount of OH radical is generated, since DMPO presents in the water 110 being treated even if the lifetime of OH radical is short. However, in the case of the first embodiment, there are disadvantages that it is not possible to accurately measure the amount of OH radical since DMPO itself is decomposed by the plasma 107, and it is necessary to add the amount of DMPO depending on adding the amount of the water 110 being treated.

The other is a method to measure OH radical by collecting a desirable amount of the water 110 being treated for the ESR measurement after a certain time that the water 110 being treated is treated by the plasma 107, and then adding DMPO. In this method, in the case that the lifetime of OH radical is short, OH radical disappears if the collecting time is longer. Therefore, this method has a disadvantage that OH radical cannot be observed unless using a specific device for sampling. However, this method has an advantage that it is not necessary to be concerned with respect to the problems of the adding amount and the decomposition of DMPO itself.

The measurement result as shown in FIG. 3 is measured by adding DMPO into the water collected from the water 110 being treated in the latter method. Since the latter method can measure OH radical sufficiently, the liquid treatment device 100 of the first embodiment can generate OH radical having a long lifetime, such as OH radical having the longer lifetime than 10 min approximately.

When the lifetime of the OH radical becomes longer, there is a great effect in a design of the liquid treatment device 100. It assumes that V is a volume of the water 110 being treated, P is a water pressure, and Q is a flow rate of the circulation pump 108 which circulates the water 110 being treated. A residence time t of radical, which is necessary for treating the water 110 being treated having the volume V, is t=PV/Q. The upper limit of the residence time t of radical is the radical lifetime since the residence time of radical is limited by the radical lifetime. Therefore, according to the above equation, in the conventional liquid treatment device, the circulation pump having a high flow rate is required in order to diffuse the radical in a whole of the water being treated for decomposing a bacteria and an organic matter in the water being treated. Accordingly, the device takes high cost, or cannot be realized since the pump having a flow rate which is actually needed does not exist. For example, assuming that V is 10 L and the radical lifetime is less than or equal to 1 msec, the circulation pump takes high cost or does not exist since the flow rate of the circulation pump 108 is made to more than or equal to 600,000 L/min. On the other hand, if the radical lifetime is approximately 10 min as the first embodiment, the flow rate of the circulation pump 108 is made to 1 L/min, and it is possible to obtain the flow rate of the viable circulation pump as the first embodiment.

[Effect (Decomposition Velocity)]

Next, there is explained the effect (decomposition velocity) of the liquid treatment device 100 according to the first embodiment of the present disclosure.

In the first embodiment, an indigo carmine solution is used to measure the decomposition velocity of the liquid treatment device 100, as a model of the water being treated. An indigo carmine is a water-soluble organic matter, and is often used as a model for the polluted water treatment. In the first embodiment, the concentration of the indigo carmine solution may be approximately 10 mg/L, and the water 110 being treated may be 600 mL.

As described above, in the first embodiment, OH radical is generated in the water 110 being treated. OH radical decomposes an indigo carmine molecule by cutting the binding of the molecule. As is generally known, the oxidation potential of the OH radical is 2.81 eV which is greater than the oxidation potential of ozone, hydrogen peroxide and chlorine. Therefore, OH radical can decompose many organic matters, which is not limited to the indigo carmine.

The decomposition velocity of the indigo carmine molecule is evaluated by the absorbance of the solution. As is generally known, when the indigo carmine molecule is decomposed, a blue color of the indigo carmine solution discolors. When the indigo carmine molecule is decomposed completely, the indigo carmine solution becomes transparent. This is because the absorption wavelength due to a double bond of the carbon (C=C) presented in the indigo carmine molecule is 608.2 nm, the binding of C=C is cleaved by decomposing the indigo carmine molecule, and thereby the absorption of light of 608.2 nm is eliminated. Therefore, the degree of decomposition of the indigo carmine molecule has been evaluated by measuring the absorbance of light having a wavelength of 608.2 nm by use of an ultraviolet-visible light spectrophotometer. However, since OH radical lifetime is short, it has not been possible to utilize OH radical effectively.

Figure 4:
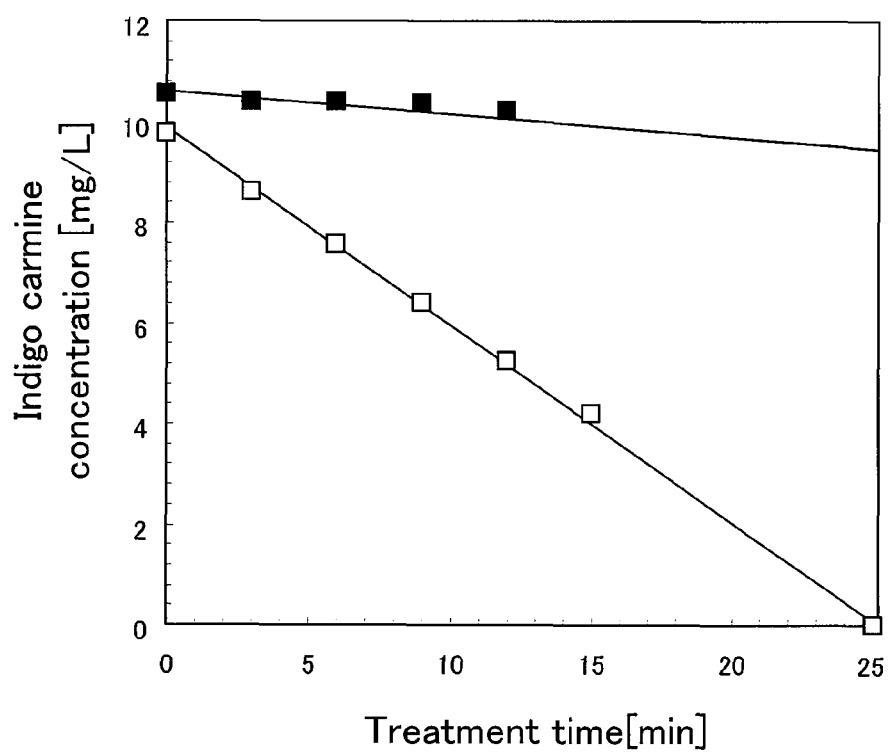
FIG. 4 shows a view of a result of measuring an amount of decomposition of an indigo carmine solution for the treatment time according to the first embodiment of the present disclosure.

FIG. 4 shows an illustration of a result of measuring an amount of decomposition of the indigo carmine solution for the treatment time according to the first embodiment of the present disclosure. The amount of decomposition is calculated by use of the relationship between the absorbance and the amount of the indigo carmine which are measured. In FIG. 4, a white square (□) indicates the measurement result of the liquid treatment device 100 according to the first embodiment, and a black square (■) indicates the measurement result of the liquid treatment device according to a reference example. Hereinafter, there is described a configuration of the reference example. The liquid treatment device of the reference example comprises a first metal electrode having a cylindrical shape with an outer diameter of 1.95 mm. The first metal electrode is made of tungsten. The outer circumference of the first metal electrode is coated by an insulator made of alumina ceramic, and is disposed in opposition to the second metal electrode. Also, the liquid treatment device of the reference example generates plasma by use of a flash boiling phenomenon. In both the first embodiment and the reference example, the power is 7 W.

As shown in FIG. 4, the liquid treatment device 100 according to the first embodiment can almost completely decompose the indigo carmine solution in 25 minutes. This is realized because OH radical has been generated effectively. On the other hand, the liquid treatment device of the reference example has taken approximately 400 min until the indigo carmine solution has been almost completely decomposed. In this way, the liquid treatment device of the first embodiment can treat the water 110 being treated in a short time because the liquid treatment device of the first embodiment can generate the plasma 107 effectively and thereby generate OH radical having a long lifetime.

Hereinafter, with respect to the decomposition of the indigo carmine in the case of the liquid treatment device according to the reference example, there is considered as follows. The diameter of the cylindrical electrode of the reference example is 1.95 mm which is larger than that of the first embodiment. Accordingly, since the electric field strength is low, plasma stability is low and a total plasma generation time is short. As a result, it is considered that the concentration of OH ion or OH radical is low, and hence the decomposition velocity slows down.

Although not shown, in the case that the plasma is generated by use of a flash boiling phenomenon at which the first metal electrode 104a and the second electrode 102 are immersed in the treated water 110 so as to opposite to the each other without the gas supply device 105, the decomposition velocity of the indigo carmine solution is reduced. It is considered that this result is attributed to an inability to generate OH radical having a long lifetime since the gas 114 is not used.

In the first embodiment, the gas supply device continues to supply the space 124a between the first metal electrode 104a and the insulator 103 with the gas 114 having a relatively large flow rate via the through-hole 123a of the first metal electrode 104a. Since a large amount of the gas 114 is supplied, the metal electrode portion 121a of the first metal electrode 104a is covered with the gas 114, and then the metal electrode portion 121a of the first metal electrode 104a is not in direct contact with the water 110 being treated. As a result, the stable plasma 107 is generated at the tip portion of the metal electrode portion 121a of the first metal electrode 104a. Also, a part of the consecutive bubble 106 which is generated at the opening portion 125 of the insulator 103 is cut in the water 110 being treated by the buoyancy force. This microbubble which is cut reaches a state of including the plasma 107. It is considered that the state of including the plasma 107 in this microbubble contributes effectively. That is, OH ion in the plasma 107 elutes as OH radical in the water, OH radical reaches the state of being trapped in the microbubble. Therefore, it is considered that OH radical lifetime is prolonged considerably.

In this way, according to the liquid treatment device 100 of the first embodiment, it is possible to generate the plasma effectively as well as reduce the manufacturing costs. As a result, the liquid treatment device 100 can treat the liquid in a short time because OH radical having a long lifetime is generated in the water 110 being treated.

Second Embodiment

Figure 5:
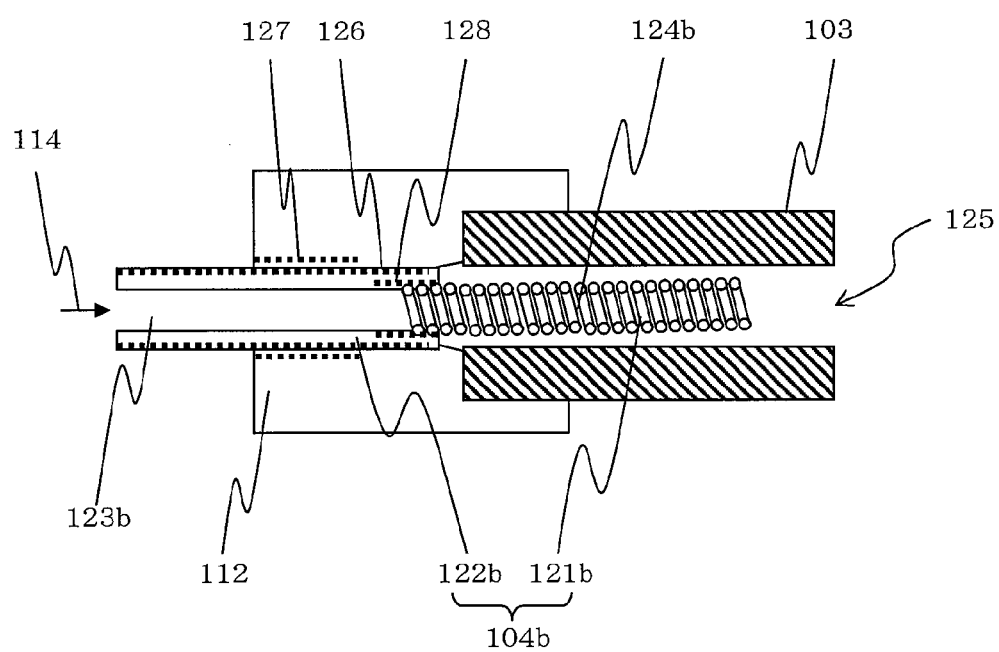
FIG. 5 shows a cross-sectional view of an electrode configuration according to a second embodiment of the present disclosure.

By use of FIG. 5, there is explained the liquid treatment device 100 according to a second embodiment of the present disclosure. In the second embodiment, an electrode configuration is different from the first embodiment. The other configuration may be similar to the first embodiment.

[Electrode Configuration]

There is explained the electrode configuration of the liquid treatment device 100 according to the second embodiment of the present disclosure.

FIG. 5 shows a cross-sectional view of the electrode configuration according to the second embodiment of the present disclosure. In the electrode configuration according to the first embodiment, the diameter of the through-hole 123a is designed to small (i.e. 0.3 mm) for connecting the space 124a (i.e. a gap of approximately 0.5 mm) between the first metal electrode 104a and the insulator 103. Therefore, it is a concern that the costs increase to process the through-hole 123a. Hereinafter, there is explained the electrode configuration according to the second embodiment which it is possible to increase the size of the through-hole.

For increasing the size of the through-hole 123b, the second embodiment uses a first metal electrode 104b being a hollow shape having an opening end instead of the first metal electrode 104a of the first embodiment. The first metal electrode 104b having a hollow shape of the second embodiment is, for example, a coil shaped electrode portion 121b of outer diameter 0.99 mm which is made from tungsten. The first metal electrode 104b having a hollow shape according to the second embodiment is not limited to a coil shape. As shown in FIG. 5, in the second embodiment, for example, the large through-hole 123b having the diameter of 1 mm is arranged at the portion of the shaft center of a metal threaded portion 122b. The large through-hole 123b is connected to a space 124b which is formed at the hollow portion of the coil shaped electrode portion 121b. Also, the connection of the coil shaped electrode portion 121b with the metal threaded portion 122b can be achieved by screwing into an inside threaded portion 128 arranged at the through-hole 123b.

With this configuration, in the second embodiment, it is possible to increase the diameter of the through-hole 123b, and reduce the manufacturing costs of the first metal electrode 104b so as not to be high costs.

Also, as shown in FIG. 5, in the second embodiment, the insulator 103 is disposed at the outside of the coil shaped electrode portion 121b. In the second embodiment, the insulator 103 may be disposed so as to contact with the side surface of the coil shaped electrode portion 121b.

When the gas 114 is supplied from the through-hole 123b of the metal threaded portion 122b, the gas 114 is supplied with the space 124b of the hollow portion of the coil shaped electrode portion 121b. Also, the coil shaped electrode portion 121b is covered by the gas 114. The opening portion 125 of the insulator 103 generates the bubble 106 in the water 110 being treated by the gas 114. Also, the gas in this bubble 106 covers the end portion of the coil shaped electrode portion 121b. The second embodiment may be similar in that the first embodiment that the opening portion 125 of the insulator 103 determines the size of the bubble 106.

[Effect (Decomposition Velocity) 2]

Next, there is explained the effect (decomposition velocity) of the liquid treatment device 100 according to the second embodiment of the present disclosure.

Figure 6:
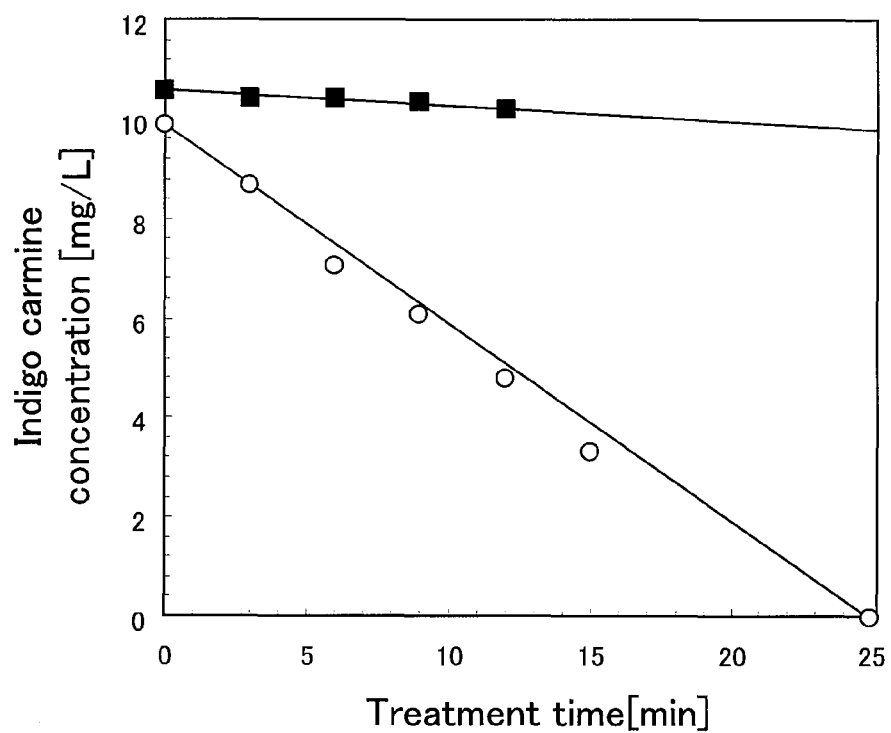
FIG. 6 shows a view of a result of measuring an amount of decomposition of the indigo carmine solution for the treatment time according to the second embodiment of the present disclosure.

FIG. 6 shows a view of a result of measuring an amount of decomposition of the indigo carmine solution for the treatment time according to the second embodiment of the present disclosure. In similar to the first embodiment, the amount of decomposition is calculated by use of the relationship between the absorbance and the amount of the indigo carmine which are measured. In FIG. 6, a white square (□) indicates the measurement result of the liquid treatment device 100 according to the second embodiment, and a black square (■) indicates the measurement result of the liquid treatment device according to the reference example. Also, a configuration of the reference example described in the second embodiment is similar to the configuration of the reference example described in the first embodiment. According to the second embodiment, the decomposition time is approximately 25 min so as to decompose the indigo carmine of 10 mg/L completely. The decomposition time is similar to that of the first embodiment. Therefore, according to the liquid treatment device 100 of the second embodiment, it is possible to generate the plasma 107 effectively as well as reduce the manufacturing costs.

Next, there is explained the decomposition velocity of the indigo carmine solution with respect to a distance d at which the first metal electrodes 104a, 104b according to the first and the second embodiments are retracted inward from the end surface of the opening portion 125 of the insulator 103.

Figure 7:
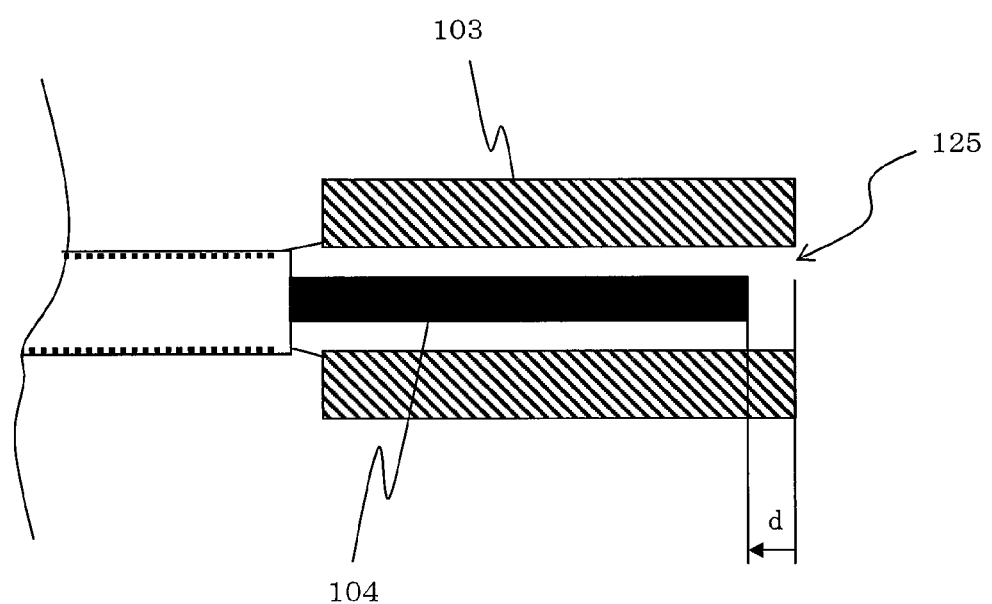
FIG. 7 shows a diagram illustrating a distance at which the first metal electrode is retracted inward from an end surface of an opening portion of an insulator according to the first and the second embodiments of the present disclosure.
Figure 8:
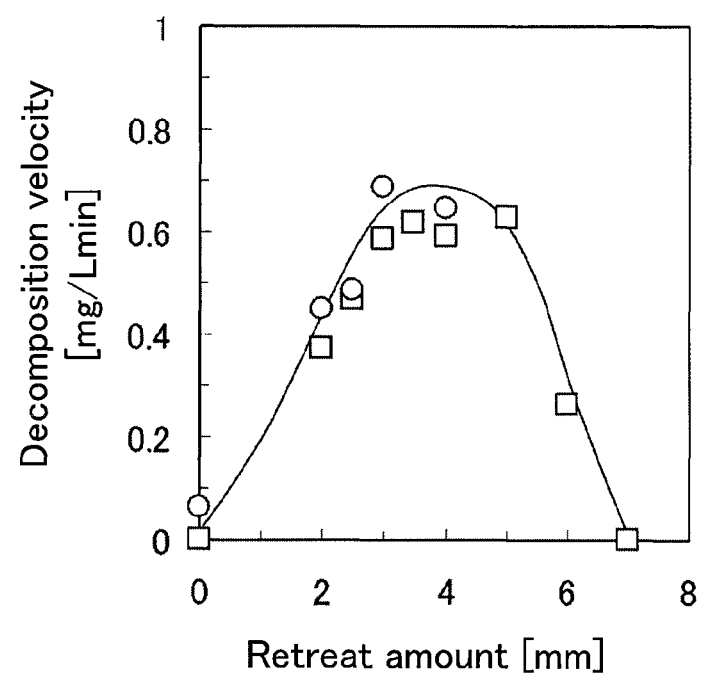
FIG. 8 shows measurement results of a decomposition velocity of the indigo carmine solution for a distance at which the first metal electrode is retracted inward from an end surface of an opening portion of an insulator according to the first and the second embodiments of the present disclosure.

FIG. 7 shows a diagram illustrating the distance (a retreat amount) d at which the first metal electrode 104 is retracted inward from the end surface of the opening portion 125 of the insulator 103 according to the first and the second embodiments of the present disclosure. Here, a reference 104 in FIG. 7 indicates the first metal electrodes 104a, 104b of the first and second embodiments. In FIG. 7, the retreat amount d of the first embodiment is defined, and the definition of the retreat amount d of the second embodiment also is similar. FIG. 8 shows measurement results of a decomposition velocity of the indigo carmine solution with respect to the distance (the retreat amount) d at which the first metal electrode 104 is retracted inward from the end surface of the opening portion 125 of the insulator 103 according to the first and the second embodiments of the present disclosure. In FIG. 8, a white square (□) indicates the measurement result of the liquid treatment device 100 according to the first embodiment, and a white circle (○) indicates the measurement result of the liquid treatment device according to the second embodiment.

As shown in FIG. 8, in the case that the first metal electrode 104 is retracted inward from the end surface of the opening portion 125 of the insulator 103, the decomposition velocity of the indigo carmine solution is increased when the retreat amount d exists in a range of more than zero and less than 7 mm. Also, when the retreat amount d exists in ranging from 3 to 5 mm, there is the area having the maximum decomposition velocity of the indigo carmine solution. Therefore, the retreat amount d preferably exists in the range of more than zero and less than 7 mm, and more preferably exists in ranging from 3 to 5 mm.

Also, as shown in FIG. 8, the decomposition velocity is reduced when the retreat amount d exists in ranging from 3 to 5 mm as the border. In other words, there is the border when the retreat amount d exists in ranging from 3 to 5 mm, the curve line is formed asymmetric in the area which the retreat amount d is small (the area which the retreat amount d exists in ranging from 0 to 3 mm) and the area which the retreat amount d is large (the area which the retreat amount d exists in ranging from 5 to 7 mm). It is considered that this means that the dominant mechanism is different between the small area and the large area with respect to the retreat amount d. In the small area of the retreat amount d, when the retreat amount d is larger, the first metal electrode 104 becomes difficult to contact with the water 110 being treated. The loss of the voltage is low, and thereby the discharge becomes stable. As a result, the decomposition velocity of the indigo carmine solution is increased. On the other hand, in the large area of the retreat amount d, when the retreat amount is larger, the distance between the first metal electrode 104 and the gas-liquid interface becomes larger. The discharge becomes difficult to start, and thereby the discharge does not become stable. As a result, the plasma 107 is not finally generated. The distance between the first metal electrode and the gas-liquid interface corresponds to the distance between the electrodes. When the retreat amount d is larger, the distance between the electrodes is longer. It means that the electric field strength is low when the voltage is constant. In the other words, when the retreat amount d is too large, the discharge is not stable because the insulation breakdown is difficult. Therefore, it is considered that the decomposition velocity of the indigo carmine solution is low.

Also, in the small area of the retreat amount d, the decomposition velocity of the indigo carmine solution is changed by the voltage loss due to a water leakage, and the change of the decomposition velocity is gradual with respect to the retreat amount d. On the other hand, in the large area of the retreat amount d, the decomposition velocity of the indigo carmine is changed by the reduction of the electric field intensity according to the Paschen's law, and the changes of the decomposition velocity is comparatively precipitous. Therefore, an accuracy of adjustment in the large area of the retreat amount d may be set higher than the accuracy of adjustment in the small area of the retreat amount d. When this accuracy of adjustment is low, it may be possible to increase the dispersion of the decomposition velocity of the indigo carmine. For example, the accuracy of adjustment of the retreat amount d in the large area may be set higher than the accuracy of adjustment of the retreat amount d in the small area by approximately at least 30 percent, more preferably, by 10-times.

Third Embodiment

Figure 9:
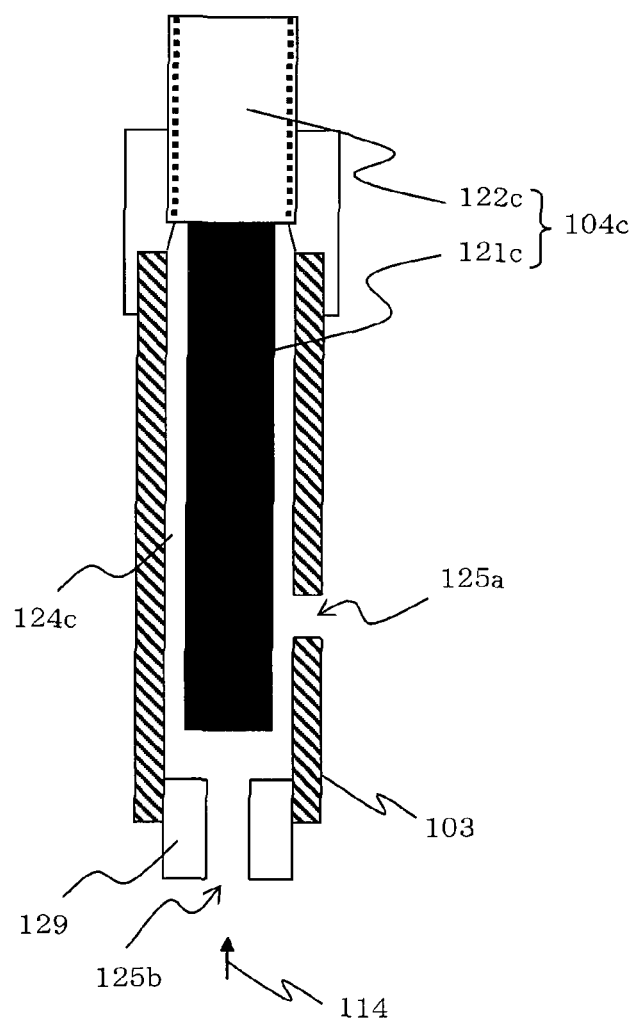
FIG. 9 shows a cross-sectional view of an electrode configuration according to a third embodiment of the present disclosure.

By use of FIG. 9, there is explained the liquid treatment device 100 according to a third embodiment of the present disclosure. In the third embodiment, an electrode configuration is different from the first embodiment. The other configuration may be similar to the first embodiment.

[Electrode Configuration]

There is explained the electrode configuration of the liquid treatment device 100 according to the third embodiment of the present disclosure.

As is well known from the Poisson equation, when the diameter of the opening portion 125 of insulator 103 for generating the bubble 106 is small, the electric field strength increases in inversely proportion to the square of the diameter. Therefore, in order to increase the electric field strength, the diameter of the opening portion 125 of the insulator 103 may be reduced. In the first and second embodiments, the diameters of the metal electrode portion 121a or the coil shaped electrode portion 121b of the first metal electrode 104a, 104b may be reduced accordingly because the opening portion 125 is arranged at the insulator 103. In reducing the diameters of the metal electrode portion 121a and the coil-shaped electrode portion 121b, the manufacturing becomes difficult, and the discharge becomes stronger at the tip part of the metal having the small diameter. As a result, there occurs a problem that a galling of an electrode increases. Therefore, there is explained the liquid treatment device 100 according to the third embodiment which is possible to change the diameter of the opening portion 125 of the insulator 103 independently, regardless of the diameters of the metal electrode portion 121a and the coil shaped electrode portion 121b.

FIG. 9 shows a cross-sectional view of the electrode configuration according to the third embodiment of the present disclosure. As shown in FIG. 9, the insulator 103 is arranged so that a space 124c is formed at the outer circumference of the metal electrode portion 121c of the first metal electrode 104c. At the side surface of the insulator 103, a first opening portion 125a which generates the bubble 106 in the water 110 being treated. In addition, at the end surface of the insulator 103, a second opening portion 125b is connected with the gas supply device 105. At the second opening portion 125b, the gas supply device 105 supplies the space 124c with the gas 114. Here, in order to connect the second opening portion 125b with the gas supply device 105, a second insulator 129 may be arranged inside of to the second opening portion 125b. The gas 114 covers the metal electrode portion 121c of the first metal electrode 104c because the gas supply device 105 continues to supply the space 124c with the gas 114. And, the first opening portion 125a generates the bubble 106 in the water 110 being treated from the gas 114. The size of the bubble 106 is determined by the first opening portion 125a, like the first and second embodiments. In the third embodiment, as an example, the first metal electrode portion 121c of the first metal electrode 104c is made of tungsten and has the diameter of 1.95 mm. The metal threaded portion 122c is made of iron and has the diameter of 3 mm. Also, as an example, the insulator 103 is made of alumina ceramic and has the inside diameter of 3 mm. Therefore, for example, the space 124c between the first metal electrode 104c and the insulator 103 has the gap of approximately 0.5 mm.

With this configuration, in the liquid treatment device 100 according to the third embodiment, it is possible to determine the diameter of the first opening portion 125a independently regardless of the diameter of the metal electrode portion 121c of the first metal electrode 104c. As a result, it is possible to increase the electric field strength by reducing the diameter of the first opening portion 125a. Therefore, according to the liquid treatment device 100 of the third embodiment, it is possible to generate the more stable plasma 107 which is formed from the metal electrode portion 121c of the first metal electrode 104c into the bubble 106 in the vicinity of the first opening portion 125a by reducing the diameter of the first opening portion 125a and increasing the electric field strength. Therefore, it is possible to release a large amount of OH radical in the water 110 being treated. Also, in the third embodiment, a supplying path of the gas 114 can be separated from the first metal electrode 104c. As a result, the manufacturing costs can be reduced because the through-hole may be not arranged at the first metal electrode 104c.

[Effect (Decomposition Velocity) 3]

Figure 10:
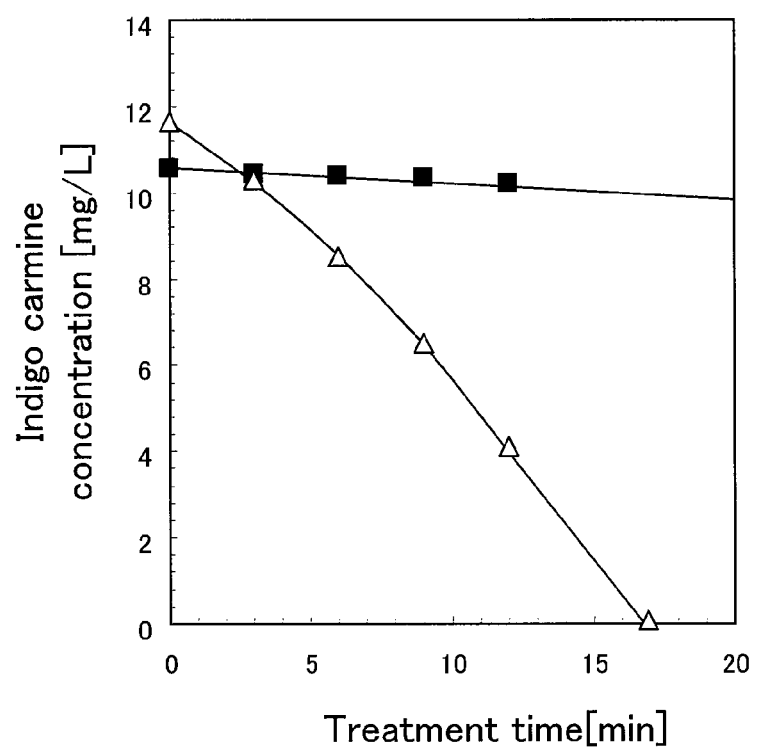
FIG. 10 shows a view of a result of measuring an amount of decomposition of the indigo carmine solution for the treatment time according to the third embodiment of the present disclosure.

FIG. 10 shows a view of a result of measuring an amount of decomposition of the indigo carmine solution for the treatment time according to the third embodiment of the present disclosure. In similar to the first embodiment, the amount of decomposition is calculated by use of the relationship between the absorbance and the amount of the indigo carmine which are measured. In FIG. 10, a white triangle (Δ) indicates the measurement result of the liquid treatment device 100 according to the third embodiment. And, a black square (■) indicates the measurement result of the liquid treatment device according to the reference example. As an example, the first opening portion 125a of the insulator 103 according to the third embodiment has the diameter of 0.7 mm. The configuration of the reference example is similar to that used in the first embodiment. According to the liquid treatment device 100 of the third embodiment, it takes approximately 17 min to decompose the indigo carmine of approximately 10 mg/L completely, and the decomposition velocity is increased as compared with the first and second embodiment. This is because the diameter 0.7 mm of the first opening portion 125a of the third embodiment is smaller than the diameter 1 mm of the opening portion 125 of the first and second embodiments. In other words, the electric field strength of the first opening portion 125a of the liquid treatment device 100 according to the third embodiment is twice greater than the first and second embodiments. Therefore, it is considered that the plasma 107 is stable, further the plasma density is increased, and the amount of OH radical is increased. Hence, the liquid treatment device 100 according to the third embodiment can generate the plasma 107 effectively, and can generate OH radical having a long lifetime in the water 110 being treated. As a result, the liquid treatment device 100 according to the third embodiment can treat the liquid in a short time.

Figure 11:
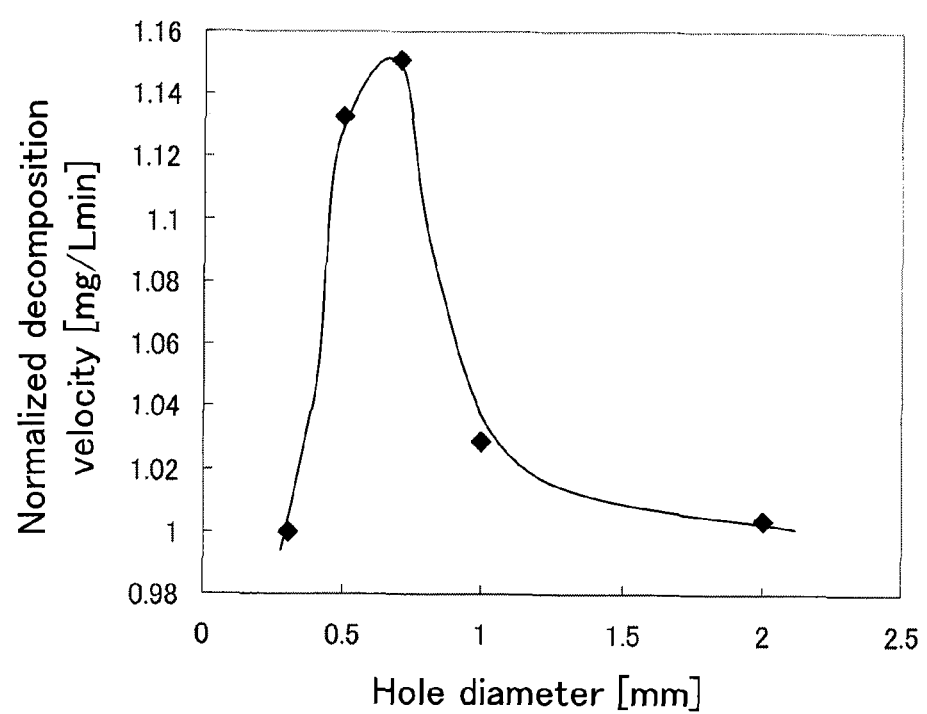
FIG. 11 shows a measurement result of a dependence of the decomposition velocity of the indigo carmine solution to the diameter of the first opening portion according to the third embodiment of the present disclosure.
Figure 12:
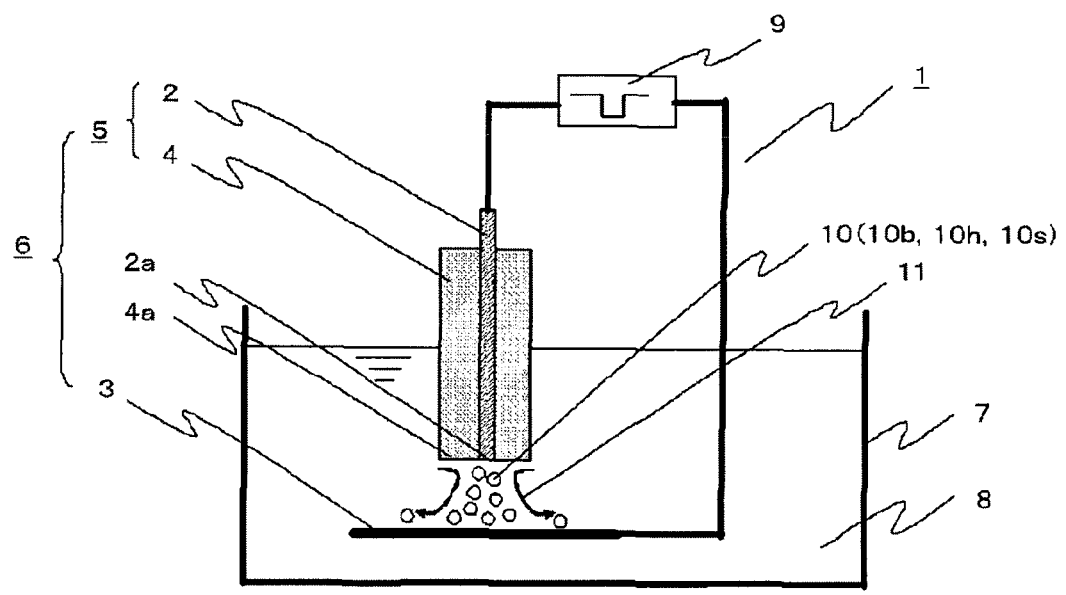
FIG. 12 shows a block diagram of a waste water treatment device using a conventional high-voltage pulse discharge.

FIG. 11 shows a view of a dependence of the decomposition velocity of the indigo carmine solution to the diameter of the first opening portion 125a according to the third embodiment of the present disclosure.

In FIG. 11, a black diamond shape (♦) indicates the measurement result of the decomposition velocity with respect to the diameter of the first opening portion 125a according to the third embodiment. As shown in FIG. 11, when the diameter of the first opening portion 125a of the insulator 103 exists in ranging from 0.3 to 2 mm, the decomposition velocity of the indigo carmine is increased. In ranging from 0.5 mm to 0.7 mm, there is the area at which the decomposition velocity is greatest. This is because the electric field strength is increased in inversely proportion to the square of the diameter when the diameter of the first opening portion 125a is reduced. Therefore, the generation of the plasma is stable, and the decomposition velocity of the indigo carmine is increased. However, when the diameter of the first opening portion 125a is further reduced from the greatest value of the decomposition velocity as the border (in the range of 0.5 to 0.7 mm), the decomposition velocity of the indigo carmine is reduced. This is because the volume of the plasma becomes a factor for determining the decomposition velocity. That is, when the diameter of the first opening portion 125a is reduced, the size of the bubble 106 is reduced. Therefore, the decomposition velocity of the indigo carmine is reduced because the number density of OH ion generated in the plasma is reduced. The volume of the bubble is reduced in proportion to the cube of the opening diameter. Therefore, the decomposition velocity of the indigo carmine is reduced precipitously from the greatest value. From the above, the first opening portion 125a of the insulator 103 preferably has the diameter ranging from 0.3 to 2 mm, and more preferably has the diameter ranging from 0.5 mm to 0.7 mm. In the liquid treatment device 100 according to the third embodiment, when the diameter of the first opening portion 125a is in the above range, it is possible to generate the plasma 107 effectively and generate OH radical having a long lifetime.

The present disclosure may include the appropriate combination of any embodiment in any one of the various embodiments, and can achieve the effect of each embodiment.

The liquid treatment device according to the present disclosure is capable of generating OH radical having a long lifetime stably and effectively. Therefore, it is useful as a water clarification device in such as sewage treatment.

The invention claimed is:

1. A liquid treatment device comprising:
   a first metal electrode having a part disposed in a reaction tank into which a water being treated is filled;
   a second metal electrode disposed in the reaction tank;
   an insulator disposed around an outer circumference of the first metal electrode with a space between the outer circumference of the first metal electrode and the insulator, wherein the insulator has an opening portion;
   a gas supply device that supplies the space with a gas for generating the bubble; and
   a power supply that applies a voltage between the first metal electrode and the second metal electrode,
   wherein:
   when no voltage is applied between the first metal electrode and the second metal electrode, the gas supply device supplies the gas in the space with a gas flow rate such that the bubble is made so as to cover the metal electrode portion of the first metal electrode, and the bubble becomes a single bubble uninterrupted over a constant distance from the opening portion of the insulator,
   the first metal electrode connects at least two portions, the at least two portions includes a one end side portion disposed in the reaction tank and the other end side portion connected to the power supply, and
   the first metal electrode comprises the one end side portion and the other end side portion which are made of a different material each other.

2. The liquid treatment device according to claim 1, wherein the first metal electrode is a hollow shape having an opening end.

3. The liquid treatment device according to claim 1, wherein the part of the first metal electrode disposed in the reaction tank has a coil-shape.

4. The liquid treatment device according to claim 1, wherein the insulator has a plurality of the opening portions.

5. The liquid treatment device according to claim 1, wherein the other end portion of the first metal electrode comprises a threaded portion.

6. The liquid treatment device according to claim 1, wherein a through-hole is made at the other end portion of the first metal electrode so as to connect the gas supply device with the space.

7. The liquid treatment device according to claim 1, wherein the first metal electrode is disposed at a position which is more than zero and less than 7 mm inward from the opening portion of the insulator.

8. The liquid treatment device according to claim 1, wherein the insulator has a first opening portion generating the bubble in the water being treated, and a second opening portion connected with the gas supply device.

9. The liquid treatment device according to claim 8, wherein the first opening portion of the insulator has a diameter ranging from 0.3 mm to 2 mm.

10. The liquid treatment device according to claim 1, further comprising: a reaction tank in which the first metal electrode and the second metal electrode are disposed.

11. The liquid treatment device according to claim 10, wherein an inside wall of the reaction tank is connected to ground.

12. The liquid treatment device according to claim 1, further comprising: a treatment tank which is connected to the reaction tank by use of a circulation pump and a pipe.

13. The liquid treatment device according to claim 12, wherein the treatment tank is selected from a group of a water clarification device, an air conditioner, a humidifier, a washing machine, an electric razor washer, and a dish washer.

14. The liquid treatment device according to claim 12, wherein the treatment tank is electrically connected to ground.

15. The liquid treatment device according to claim 1, wherein a voltage is applied by use of the power supply so as to discharge between the first metal electrode and the second metal electrode to generate plasma in the bubble, and treat the water being treated.

16. A liquid treatment method comprising:
disposing at least a part of a first metal electrode in a water being treated, the first metal electrode having an insulator around an outer circumference of the first metal electrode with a space between the outer circumference of the first metal electrode and the insulator, wherein the insulator has an opening portion;
disposing at least a part of a second metal electrode in the water being treated;
while no voltage is applied between the first metal electrode and the second metal electrode, supplying a gas in the space with a gas flow rate such that the bubble is made so as to cover the metal electrode portion of the first metal electrode, wherein the bubble becomes a single bubble uninterrupted over a constant distance from the opening portion of the insulator; and
after the bubble is formed, applying a voltage between the first metal electrode and the second metal electrode.

17. The liquid treatment method according to claim 16, wherein applying a voltage includes discharging between the first metal electrode and the second metal electrode, generating plasma in the bubble, and treating the water being treated.

* * * * *